Figure 1:
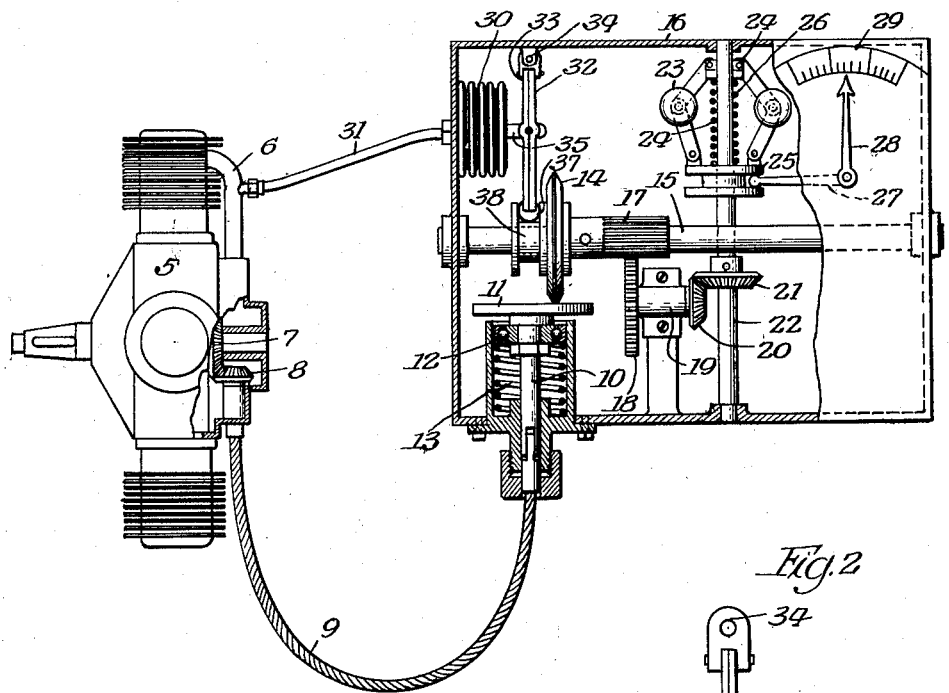

Sept. 20, 1938.  M. W. MANCHESTER  2,130,591

POWER METER

Filed Nov. 13, 1934

Inventor
Mitchell W. Manchester
By Fred Gerlach
his Atty.

Patented Sept. 20, 1938

2,130,591

UNITED STATES PATENT OFFICE 2,130,591

POWER METER

Mitchell W. Manchester, Williamsport, Pa., assignor, by mesne assignments, to Aviation Manufacturing Corporation, Chicago, Ill., a corporation of Delaware Application November 13, 1934, Serial No. 752,863

2 Claims. (Cl. 73—187)

The invention relates to power meters for internal combustion engines.

In aircraft it is desirable to operate the engine at full throttle only during the comparatively brief periods necessary for the take-off and initial climb conditions and for such other short periods as might require the maximum power available. The cruising speed should be generally performed at approximately three quarters of the maximum engine power. If the engine is operated continuously at full throttle its life would be appreciably shortened. When controllable pitch propellers are used, the pitch angle of the propeller blades is a factor which must be known before the pilot can estimate the percentage of rated engine power at which he is flying. Even though the pilot should be flying at a known propeller setting the power will vary with altitude, speed, propeller characteristics, and other factors.

One object of the invention is to provide a power meter from which the pilot can be kept continuously informed of the power output of the engine under these varying conditions so that he can determine the power output of the engine at all times and keep its speed so far as possible within the normal or optimal speed of the engine. By avoiding the use of the maximum power output available as much as possible and operating the engine within the manufacturer's recommendations, the engine's reliability is increased and the maintenance cost reduced.

This object is attained primarily by providing a power meter in which the indicator is operated by the combined action of means responsive to variations in the pressure of the combustible fluid in the intake manifold of the engine and means responsive to the speed of the engine.

The variations in temperature of the air entering the intake manifold is also a factor in determining the power output of the engine, and another object of the invention is to provide a power meter which is also responsive to these variations.

Other objects of the invention will appear from the detailed description.

The invention consists in the several novel features hereinafter set forth and more particularly defined by claims at the conclusion hereof.

Figure 2:
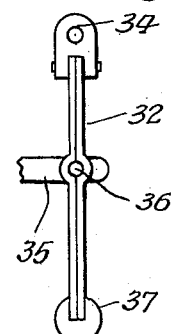

In the drawing:

Fig. 1 is a view partly in elevation and partly in section of a power meter embodying the invention and showing diagrammatically the internal combustion engine with which it is used; and Fig. 2 is a detail of the thermally variable operating connection between the fluid pressure means which is responsive to the pressure in the intake manifold of the engine and the speed responsive mechanism which operates the indicator.

The invention is exemplified with a radial type of internal combustion engine 5 which is conventionally shown in the drawing and which comprises an intake manifold 6 through which the combustible fluid or fuel passes to the engine cylinders. An engine driven beveled gear 7 drives a gear 8 which is connected to drive a flexible shaft 9 at a speed corresponding to that of the crank shaft of the engine. Shaft 9 is connected to drive a shaft 10 to the upper end of which is journalled a friction driving disk 11. A friction wheel 14 is journalled and slidable on a shaft 15 which is mounted in a meter case 16. Wheel 14 is provided on its hub with a pinion 17 for operating the indicator. Wheel 14 is slidable on shaft 15 so it may be moved to and from the axis of the disk 11 to vary the speed of the indicator operating pinion 17 by means hereinafter described. Disk 11 and shaft 10 are urged into contact with the periphery of wheel 14 by a spring 13. Pinion 17 meshes with and drives a gear 18 which is fixed to a shaft which is journalled in a bearing 19 in the case 16. A bevelled pinion 20 is fixed to rotate with gear 18 and meshes with a bevelled gear 21 fixed to a vertical shaft 22 which is journalled in the top and bottom of case 16. Centrifugally operated balls 23 are linked to a collar 24 which is driven by shaft 22. The balls 23 are also linked to a grooved collar 25 and are adapted to move said collar longitudinally of shaft 22 against the force of a spring 26 responsive to speed variations. An indicating needle or pointer 28 is fixed to a shaft pivoted in the front of the case 16 and an arm 27 movable with said shaft and needle extends into the annular groove in collar 25 so that the needle will traverse a scale 29 responsively to movements of the collar 25. This exemplifies mechanism responsive to the speed of the engine 5 for operating the indicating needle 28.

A corrugated bellows 30 is mounted in the case 16 and its fixed end is connected by a pipe 31 to the intake manifold 6 so that the free end of the bellows will be moved responsively to pressure variations in the intake manifold. The free end of the bellows is operatively connected to a lever composed of strips 32, 33, the upper end of which is pivoted at 34 to the case 16, by means of a stud 35 which is pivoted to the lever at 36. The lower terminal 37 of the lever 33 extends into an annular groove 38 in the hub of friction wheel 14 so that the variations in the pressure of the bellows effect a movement of the friction wheel 14 to and from the axis of the shaft 10 and friction disk 11 to vary the speed of wheel 14 relatively to the speed of disk 11 which rotates at a speed proportionate to the speed of the engine.

The power developed by the engine is primarily a function of the weight of fuel and air which pass through the manifold in a unit of time and is therefore about directly proportional to the engine speed and the density of the fuel charge induced in the engine. The fuel charge is the function of the absolute pressure which exists in a manifold. The product of manifold pressure and speed may therefore be used as a measure of the engine power. The bellows 30 will contract with a reduction in the manifold pressure due to the atmospheric pressure which is present on its external surfaces and will expand if the manifold pressure should increase. This motion is transmitted to the drive wheel 14 of the indicator to vary its position on the disk 11 which is driven at a speed proportionate to the engine speed. Therefore the velocity of wheel 14 and the mechanism for operating the collar 25 is a direct function of the difference in pressure existing between the manifold and the atmosphere and the engine crank shaft speed and therefore the mechanism operated by gear 11 may be calibrated in horse power on the scale 29.

As a result of this construction the power indicated by the needle 28 on scale 29 is the product derived from the engine speed and the density of the fuel charge induced in the engine. In other words the power indication is made responsive to variations in pressure of the fuel charge and the engine speed.

The developed power may also be varied somewhat by the temperature of the air drawn into the engine from the surrounding atmosphere. To compensate for this variation, the lever operated by the stud 35 is formed of metal strips 32, 33 having different co-efficients of expansion so that the arm will deviate from straightness by an amount depending upon the air temperature. The properties and dimensions of this strip will be such that the power indication is approximately corrected according to the temperature of the charge flowing to the manifold which is related to the temperature of the air intake to the engine and so that an increase in air temperature will create a curvature in lever 33 so that the wheel 14 will be moved inwardly toward the axis of rotation of disk 11 by an amount proportional to the scale load of the engine at absolute air temperature. This compensating device produces a reasonably close approximation over the range of temperatures normally encountered in flying.

This exemplifies a power meter which provides for mechanical correction of the indicated engine power as varied by the temperature in the charge induced in the engine.

The invention exemplifies a power meter which can be advantageously used on aircraft to indicate to the pilot the horse power developed at all times so that he may avoid continuous operation of the engine at full throttle and operate the engine at the optimum speed in cruising so that the engine's reliability will not be impaired and maintenance cost may be kept low.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In a power meter for an internal combustion engine, the combination of fluid pressure means responsive to variations in the pressure of the fluid taken into the engine for combustion, rotary mechanism driven by, and directly responsive to variations in the speed of, the engine, means for combining the functions of said pressure-responsive means and said mechanism, means responsive to temperature changes for varying the effect of the operation of the pressure-responsive means, and means, controlled by the combining means, for indicating the output of the engine.

2. In a power meter for an internal combustion engine, the combination of fluid pressure means responsive to variations in the pressure of the fluid taken into the engine for combustion, means, responsive to temperature changes, operable by said means, rotary mechanism driven by and directly responsive to variations in the speed of the engine, means for combining the functions of the temperature-responsive means, and said mechanism, and means for indicating the output of the engine, controlled by the combining means.

MITCHELL W. MANCHESTER.